Aug. 31, 1965   H. WEISS   3,203,329
SHUTTER-DIAPHRAGM ASSEMBLIES FOR PHOTOGRAPHIC DEVICES
Filed March 11, 1963   8 Sheets-Sheet 1
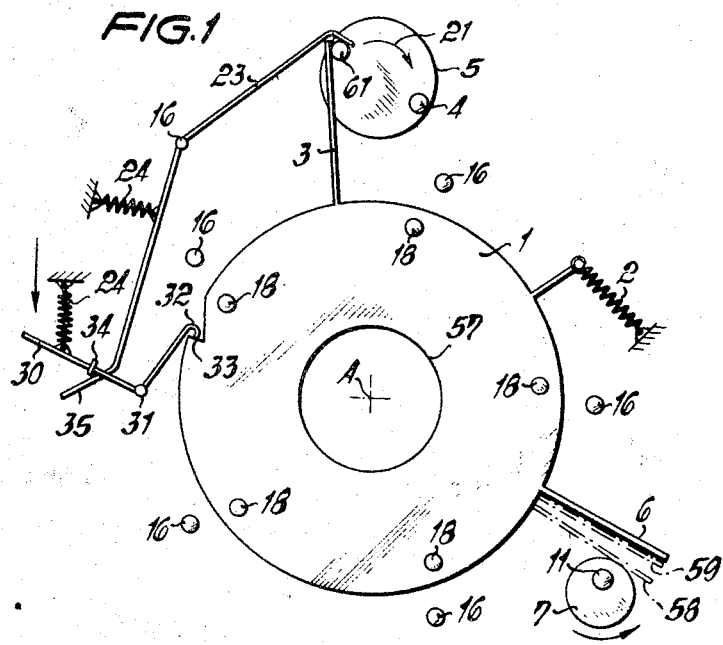
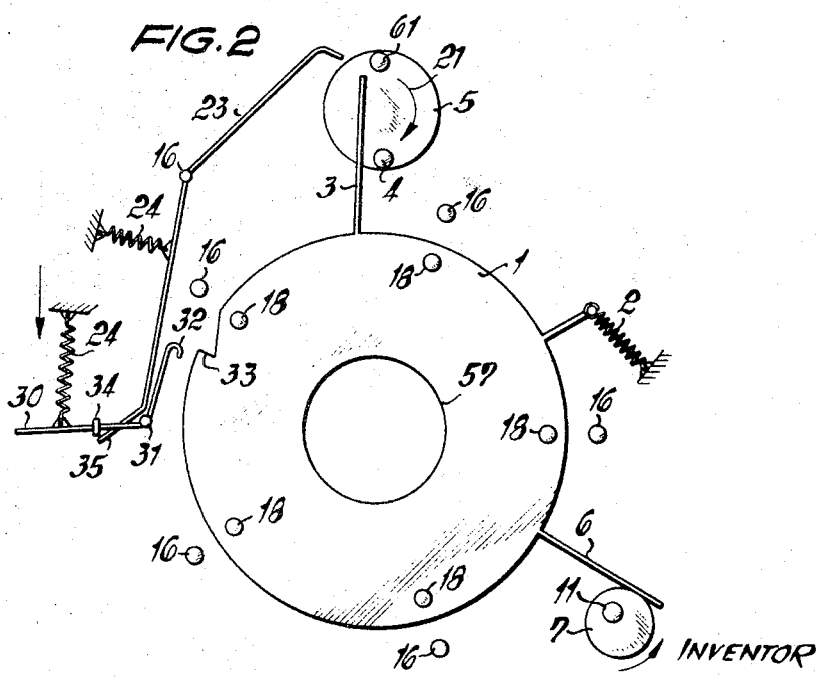
INVENTOR
Hugo Weiss
by Michael J. Striker
Atty

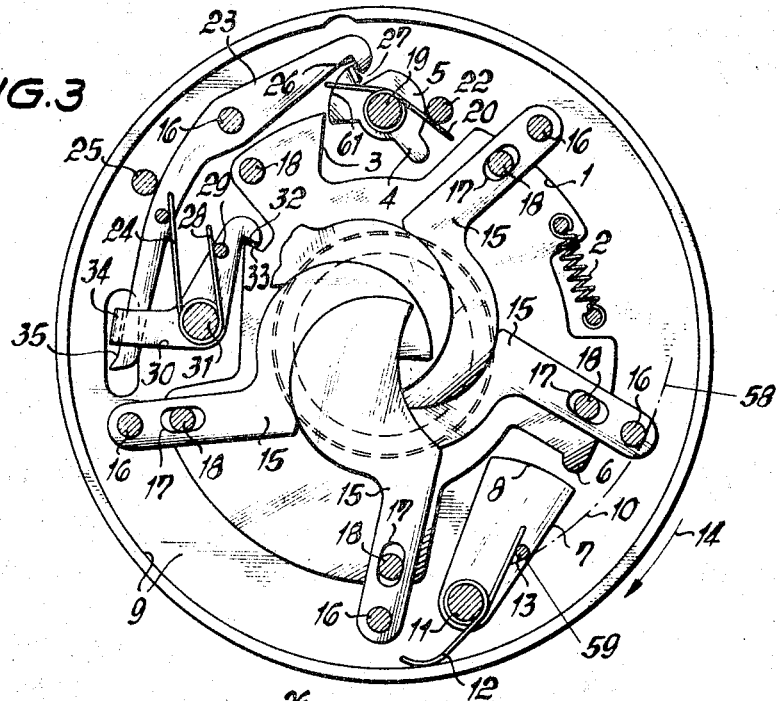
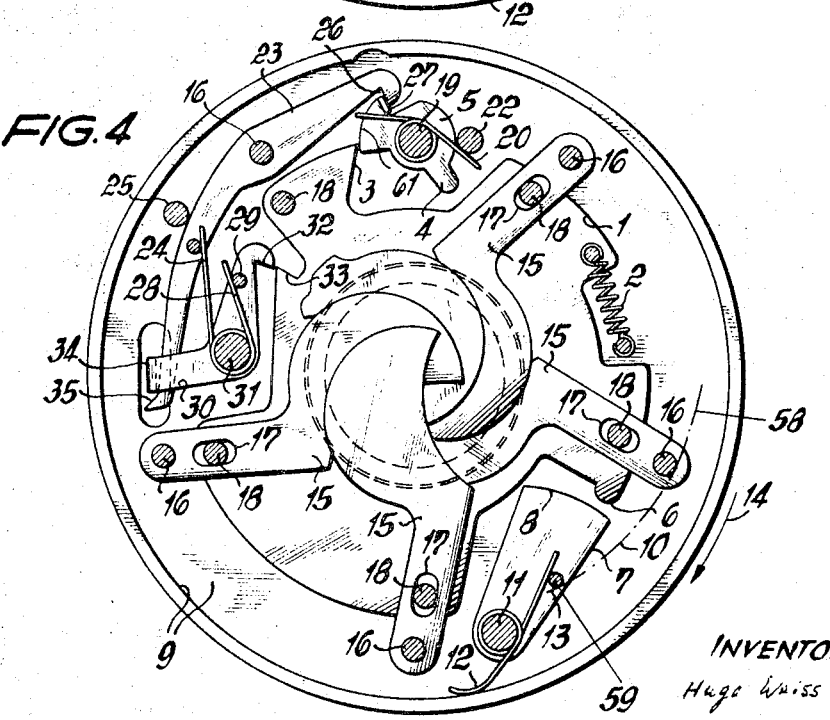

Aug. 31, 1965    H. WEISS    3,203,329
SHUTTER-DIAPHRAGM ASSEMBLIES FOR PHOTOGRAPHIC DEVICES
Filed March 11, 1963    8 Sheets-Sheet 3
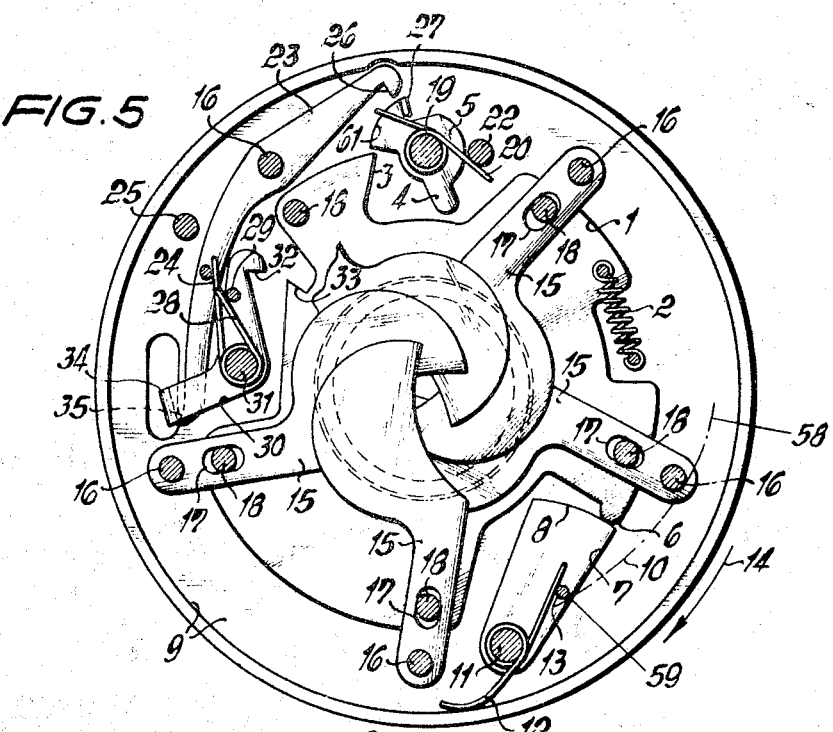
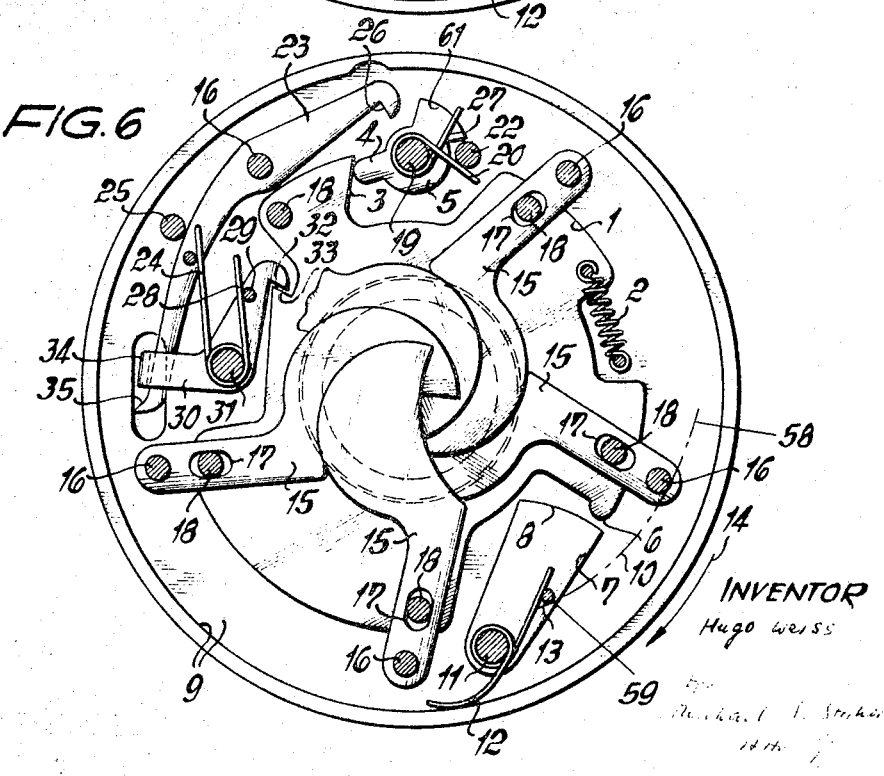
INVENTOR
Hugo Weiss Aug. 31, 1965  H. WEISS  3,203,329
SHUTTER-DIAPHRAGM ASSEMBLIES FOR PHOTOGRAPHIC DEVICES
Filed March 11, 1963  8 Sheets-Sheet 4

INVENTOR

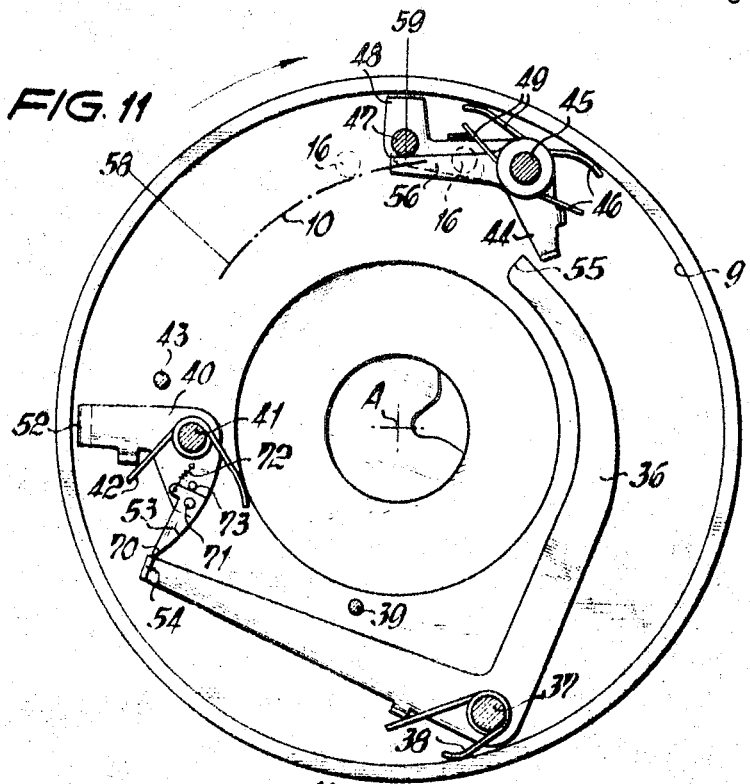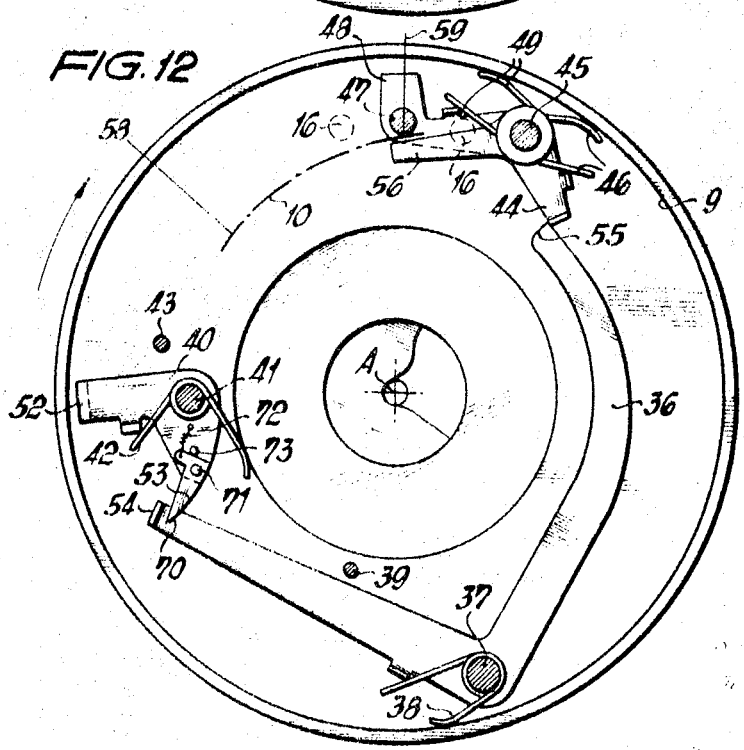

Aug. 31, 1965  H. WEISS  3,203,329
SHUTTER-DIAPHRAGM ASSEMBLIES FOR PHOTOGRAPHIC DEVICES
Filed March 11, 1963  8 Sheets-Sheet 7
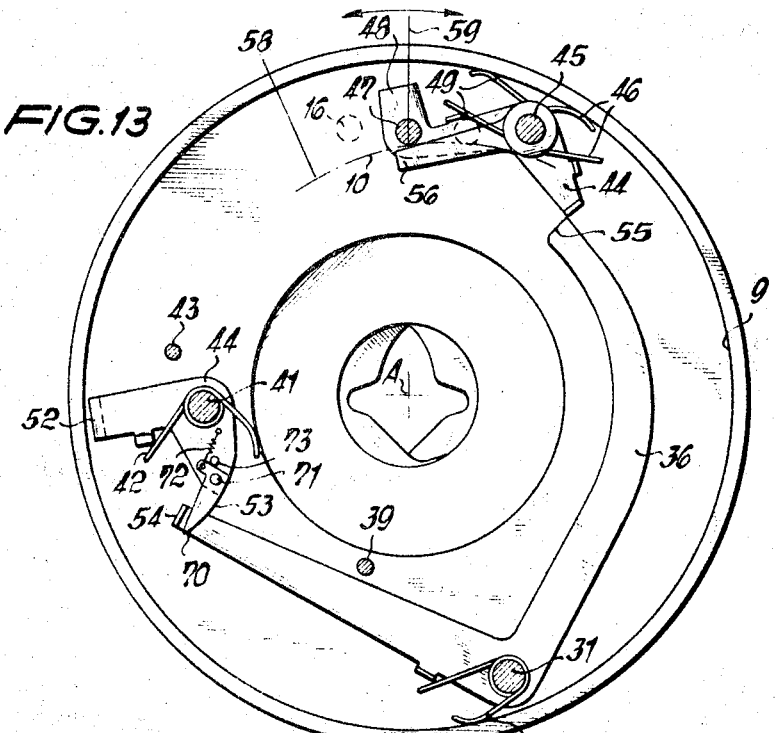
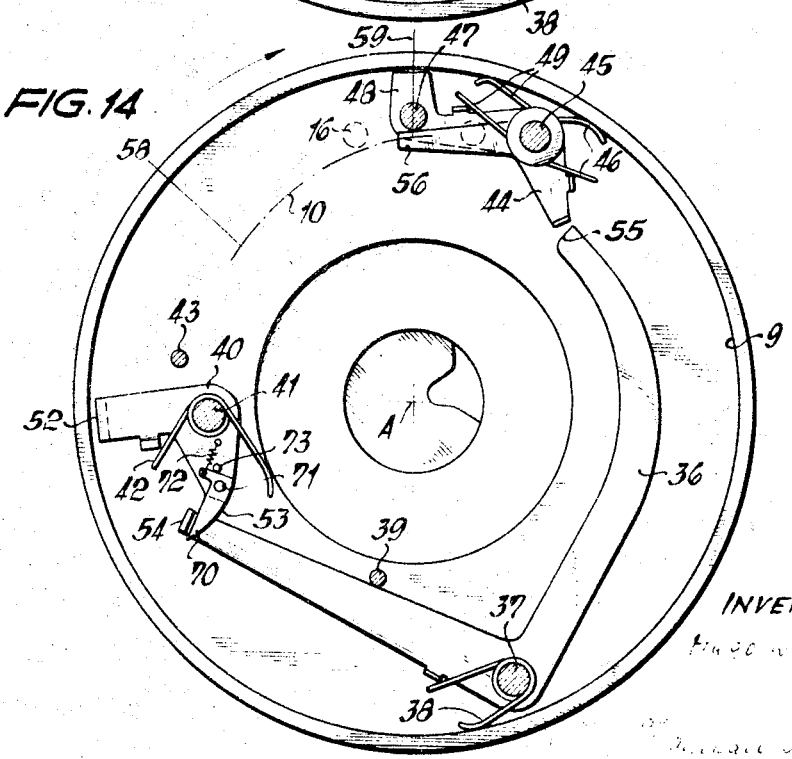
INVENTOR 3,203,329
SHUTTER-DIAPHRAGM ASSEMBLIES FOR PHOTOGRAPHIC DEVICES
Hugo Weiss, Wiesbaden, Germany, assignor, by mesne assignments, to E. I. du Pont de Nemours and Company, Wilmington, Del., a corporation of Delaware
Filed Mar. 11, 1963, Ser. No. 264,238
Claims priority, application Germany, Mar. 9, 1962, A 39,667
12 Claims. (Cl. 95—63)

The present invention relates to photographic devices. More particularly, the present invention relates to shutter-diaphragm assemblies for photographic devices. In particular, the present invention relates to a shutter-diaphragm assembly which includes a single set of blades which perform both the function of a diaphragm and the function of a shutter.

Although structures of this type are well known, they suffer from the drawback of being incapable of providing a wide range of exposure times which can be selectively used with any diaphragm setting. Thus, some known structures of this type can provide a given exposure time for a given diaphragm setting, and usually the arrangement is such that relatively small exposure times are provided for relatively small diaphragm settings and relatively large exposure time for relatively large diaphragm settings. However, it is also highly desirable not only to be able to provide a reverse combination where long exposure time can accompany small apertures but also where any one of a number of different exposure times can be provided in combination with any selected aperture.

It is therefore a primary object of the present invention to provide a shutter-diaphragm assembly which enables the operator to introduce into the camera any one of a number of given exposure times for any diaphragm setting.

Also, it is an object of the present invention to provide a shutter-diaphragm assembly in which the structure which is controlled to provide a given exposure time has no influence on the setting of the blades to provide a given aperture.

It is furthermore an object of the present invention to provide a structure of the above type in which the structure which determines the size of the aperture is adapted either for manual operation or for automatic setting by a suitable light-responsive structure.

Still another object of the present invention is to provide a structure of the above type in which manipulation of structure by the operator to initiate an operating cycle will have no influence on the manner in which the structure operates to provide a given aperture and exposure time.

Also, it is an object of the present invention to provide a structure which is capable of producing the above results with a between-the-lens shutter and which is composed of simple, rugged elements which are more reliable in operation and which provide a compact assembly capable of being accommodated in a relatively small space.

With the above objects in view, the present invention includes, in a shutter-diaphragm assembly for photographic devices, a support means which is formed with an exposure aperture whose center is in the optical axis, and a single set of blades turnably carried by the support means for swinging movement back and forth respectively about a plurality of turning axes which are parallel to the optical axis. These blades are swingable to and from a closed position covering the exposure aperture to prevent light from passing therethrough. A moving means is carried by the support means for movement from and back to a predetermined starting position, and this moving means is operatively connected to the blades for locating them in their closed position when the moving means is in its starting position, and this moving means swings the blades to uncover the exposure aperture during movement of the moving means away from its starting position and to cover the aperture during movement of the moving means back to its starting position. An adjustable limiting means is carried by the support and is located in the path of movement of the moving means from its starting position to adjustably limit the extent to which the moving means moves away from its starting position so as to limit in this way the extent to which the blades uncover the aperture, so that the blades perform the function of an adjustable diaphragm. A drive means is carried by the support means for movement through the same distance at each operation of the assembly irrespective of the extent to which the moving means moves from its starting position, and this drive means is adapted to be connected to an exposure-time determining structure and, after being retarded by the latter structure to provide a given exposure time, engages the moving means and returns the latter to its starting position so as to return the blades to their closed position, and in this way the exposure time is uninfluenced by the extent to which the aperture is uncovered by the blades and thus the single set of blades also performs the function of a shutter.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a schematic illustration of one possible assembly according to the present invention, the assembly being shown in FIG. 1 in its cocked position;

FIG. 2 shows the assembly of FIG. 1 in a position during the operation after the structure of FIG. 1 has been released;

FIG. 3 illustrates the details of an actual construction which is diagrammatically illustrated in FIG. 1;

FIG. 4 shows the structure of FIG. 3 after the operator has just started to release the structure to start a cycle of operations;

FIG. 5 shows the structure of FIG. 3 in a position which it takes subsequent to the position thereof illustrated in FIG. 4 and during actual passage of light through the aperture;

FIG. 6 shows the structure of FIG. 3 in a position which it takes subsequent to the position shown in FIG. 5 and after the exposure aperture has again been closed so that the exposure has terminated;

FIG. 11 shows the structure of FIG. 10 in the cocked position thereof just prior to release of the structure to make an exposure;

FIG. 12 shows the structure of FIG. 10 in a position which it takes subsequent to the position thereof shown in FIG. 11, and in FIG. 12 the blades partially uncover the aperture to provide an exposure aperture of a given size;

FIG. 13 shows the structure of FIG. 10 in the same position as in FIG. 12 but adjusted to provide a larger exposure aperture;

FIG. 14 shows the position which the parts of FIG. 10 take at the end of an operating cycle;

Figure 7:
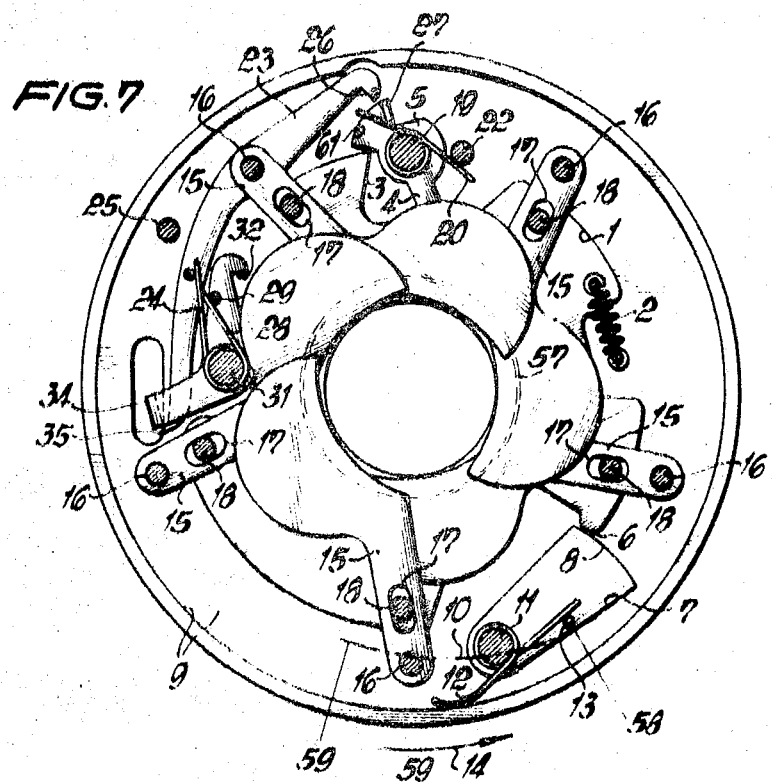
FIG. 7 shows the structure of FIG. 3 in a position similar to that shown in FIG. 5 but adjusted to provide a much larger exposure aperture.

Referring to FIGS. 1 and 2, there is diagrammatically illustrated therein a shutter-diaphragm assembly which includes a rotary moving means 1 which is urged to turn in a clockwise direction about the optical axis A by the spring 2. The blade moving means 1 is supported for rotary movement about the exposure aperture 57 which is adapted to be covered and uncovered by the several blades which are not illustrated in FIGS. 1 and 2. These blades 15 are illustrated in FIG. 3, and the support means includes the shutter housing 9 which has a stationary wall fixedly carrying the pivot pins 16 on which the several blades 15 are respectively supported for swinging movement about axes, respectively, which are parallel to and uniformly distributed about the optical axis, the blades 15 being shown in FIG. 3 in their closed position covering the aperture 57 to prevent light from passing therethrough. The several blades 15 are respectively formed with elongated slots 17 which respectively receive the pins 18 fixedly carried by the rotary moving means 1 so that when the latter turns in a clockwise direction, as viewed in FIGS. 1 and 3, the blades 15 will be displaced away from their closed position to an open position while when the ring 1 returns to the starting position thereof illustrated in FIGS. 1 and 3 the blades 15 will be returned to their closed position, so that in this way the location of the rotary moving means 1 in its starting position shown in FIGS. 1 and 3 locates the blades 15 in their closed position.

The rotary moving means 1 carries an arm 3 which in the rest position of the assembly, before cocking thereof, engages an elongated arm 4 of a rotary drive means 5, the parts being shown in this rest position in FIG. 6. The parts are shown in FIGS. 1 and 3 in the cocked position ready to make an exposure.

In addition, the rotary moving means 1 carries a projection 6 which cooperates with an adjustable limiting means for limiting the extent to which the moving means 1 is moved by the spring 2 from the starting position shown in FIGS. 1 and 3, and thus in this way the extent to which the blades 15 uncover the aperture 57 is adjusted so that the blades will provide an exposure aperture of a given size, thus performing the function of a diaphragm.

As may be seen from FIGS. 1 and 2, the adjustable limiting means can simply take the form of a disc 7 eccentrically mounted on a pivot 11 and capable of being turned to any position where its periphery will engage the arm 6 between the limits 58 and 59 so that it is possible to provide an adjustment within this range, and the eccentric 7 can be adjusted by any suitable structure to any desired angular position in which it will be maintained by any suitable structure for providing a given opening through the blades 15. In the case of FIGS. 3–7, the limiting means 7 is in the form of a lever turnable about the stationary pivot 11 carried by the support means 9 and a spring 12 engages a pin 13 carried by the lever 7 to urge the latter to turn in a clockwise direction, as viewed in FIGS. 3–7. The lever 7 has an outer curved periphery 8 which is engaged by the arm 6 to limit the turning of the ring 1 by the spring 2, and the pin 13 also engages a camming edge 10 of an unillustrated adjustable rotary ring which can be turned by any known structure to a selected angular position with respect to the optical axis. The camming edge 10 extends between the limits 58 and 59 shown in FIG. 3 to provide in a stepless manner any desired adjustment of the lever 7 between the positions of this lever when the pin 13 is located at the end 58 and the end 59 of the camming edge 10. The ring which is provided with camming edge 10 is supported for turning movement about the optical axis and can have a projection accessible to the operator and cooperating with a suitable scale of diaphragm apertures so that the operator can place the ring at a position which will produce the selected aperture, or the ring which carries the camming edge can be connected in a manner well known in the art to a known light-responsive structure which operates during the initial part of the operations to automatically turn the ring to a position called for by the lighting conditions. The element which is connected to the ring which carries the camming edge 10 to manually turn this ring can cooperate with a suitable detent structure for releasably maintaining the ring in any selected position or it may cooperate with a friction device which frictionally maintains the ring in its adjusted position, or a worm drive or any other suitable mechanical structure may be used for this purpose.

Instead of being pulled by a tensioned spring 2, the ring 1 may be turned by a compression spring, but in any event the spring turns the ring 1 until its arm 6 engages the edge 8 of the lever 7, the ring turning at this time in the direction of arrow 14 of FIG. 3. In the example of FIG. 3 there are five blades 15 which have a suitable configuration, as illustrated, so that during exposure there will be no star-shaped opening through which the light passes.

The rotary drive means 5 is supported for rotary movement by a stationary pin 19 carried by the support means 9, and a spring 20 engages a stationary pin 22 and a lug 27 of the rotary member 5 for urging the latter to turn in a clockwise direction, as viewed in FIG. 3. The clockwise turning is shown in FIGS. 1 and 2 by the arrow 21, and this turning will continue until the lug 27 engages the pin 22.

A manually operable release means 23 cooperates with the drive means 5 for releasably holding the latter in its cocked position in opposition to the spring 20, and this release means 23 takes the form of an elongated lever supported for turning movement by one of the pins 16 and urged to turn in a clockwise direction by a spring 24 which engages a pin carried by the lever 23. This turning of the lever 23 is limited by a stationary pin 25 which engages the lever 23. In the cocked position shown in FIGS. 1 and 3 a projection 26 at an end of the lever 23 engages the lug 27 to prevent turning of the drive member 5 by spring 20.

The spring 24 has an end portion 28 engaging a pin 29 fixed to a manually operable means in the form of a lever 30 which is adapted to be turned by the operator and which for this purpose has a portion extending to the exterior of the assembly. The manually operable release means 30 is in the form of a lever supported for turning movement by the stationary pin 31 and urged in a clockwise direction, as viewed in FIGS. 1 and 3, by the spring 24. In the cocked and rest positions shown respectively in FIGS. 3 and 6 the projection 32 of the lever 30 engages a tooth 33 of the ring 1 to prevent the latter from being turned by the tensioned spring 2.

Assuming now that the parts are in the cocked position shown in FIGS. 1 and 3 and that the operator decides to make an exposure, the operator will simply engage the member 30 and turn the latter in opposition to the spring 24 in a counterclockwise direction, as viewed in FIGS. 1 and 3, so as to displace the projection 32 away from the tooth 33 and thus release the moving means 1 to the spring means 2 which only turns the moving means through the slight distance required to place the arm 3 of the ring 1 in engagement with the arcuate edge portion 61 of the rotary member 5, this edge portion 61 extending along a circle whose center is in the turning axis of the rotary member 5 and whose radius is smaller than the radial distance of the outer tip of the arm 4 from the turning axis of the rotary member 5. The parts are shown in this position in FIG. 4, and it will be noted that the blades 15 still have not been moved sufficiently to provide any uncovering of the aperture 57. This preliminary stopping of the ring 1 is used for the purpose of setting into operation an unillustrated self-timer which may optionally be set into operation when it is desired, for example, to delay the making of an exposure for a predetermined period of time so that, for example, the operator may photograph himself. Such self-timers are well known in the art. The continued turning of the lever 30 by the operator in opposition to the spring 24 will cause the projection 34 of the lever 30 to engage the projection 35 of the release means 23 to displace the latter also in opposition to the spring 24 in a counterclockwise direction, as viewed in FIGS. 1 and 3, and this will displace the projection 26 away from the lug 27 so as to release the drive member 5 to the spring means 20 which now can act to turn the drive member 5 in a clockwise direction so as to move the edge 61 away from the arm 3 and thus release the ring 1 to the spring means 2.

FIG. 5 shows the position which the parts take just after release of the moving means 1 to the spring means 2. The spring means has moved the moving means 1 until its arm 6 engages the edge 8 of the lever 7 in order to provide the smallest extent of uncovering of the aperture 57, and the smallest exposure aperture is shown in FIG. 5. The blades 15 will remain in the position of FIG. 5 until the drive means 5 has been turned through a distance sufficient to cause its arm 4 to engage the arm 3 and return the moving means 1 to its starting position, and this is the position of the parts shown in FIG. 6. The spring 20 is of course substantially stronger than the spring 2 so that it is capable of acting through the drive means 5 on the ring 1 for returning the latter to its starting position while tensioning the spring 2. In the starting position of the ring 1, when the operator releases the lever 30 its projection 32 will engage the tooth 33 to maintain the ring 1 in its starting position during subsequent cocking of the drive means 5, and thus there is no possibility of uncovering of the aperture 57 during cocking of the drive means. Any suitable manually-engageable structure is connected to the rotary member 5 for turning the latter in a counterclockwise direction back to the starting position thereof, and of course at this time the curved edge 61 will engage the projection 26 of the lever 23 to displace the latter in opposition to the spring 24 until the projection 26 snaps over the lug 27 so that the parts will again have the position shown in FIG. 3. Thus, with the structure of the invention special levers necessary with other types of between-the-lens shutters to prevent exposure during cocking are unnecessary.

It is to be noted that the drive means 5 turns in exactly the same way through the same distance irrespective of the adjustment of the camming edge 10. Any suitable retarding structure well known in the art is connected to the member 5 to retard the turning thereof by the spring 30 so as to provide a selected exposure time, and this retarding mechanism operates on the member 5 just after it assumes the position shown in FIG. 5 and before the arm 4 engages the arm 3 so that the selected exposure time will be provided irrespective of the angular position of the ring 1. After the retarding mechanism releases the member 5 it is very quickly turned by the spring 20 to place the arm 4 in engagement with the arm 3 so as to turn ring 1 to its starting position. In this way with the structure of the invention the single set of blades 15 can perform in function both of a diaphragm and a shutter without in any way limiting the possible combination of exposure times with the possible combination of exposure apertures.

FIG. 7 shows the position which the parts take when the adjustable limiting means has been adjusted to provide the largest possible aperture.

Figure 8:
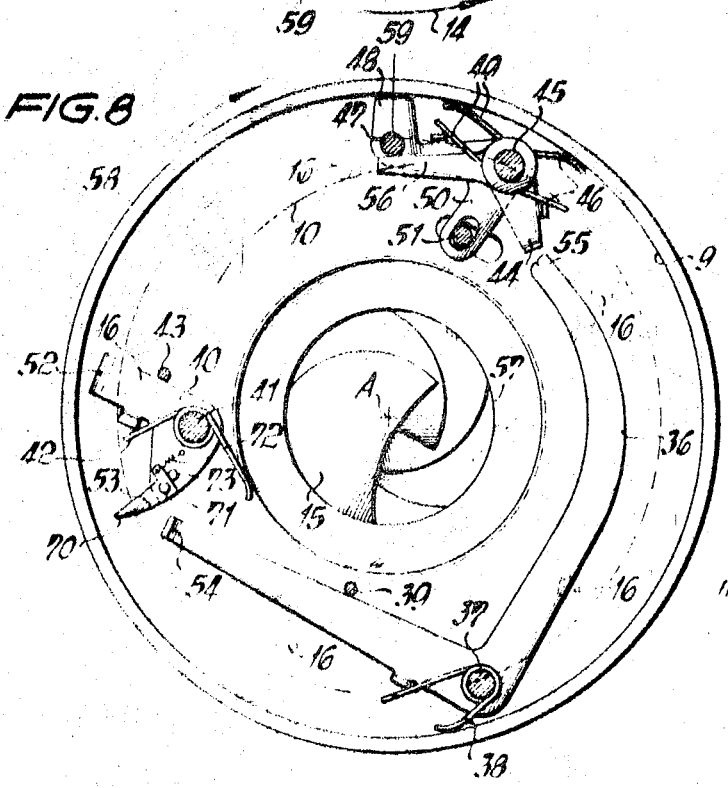
FIG. 8 is a partly schematic elevation showing the details of another embodiment of a shutter-diaphragm assembly according to the present invention.
Figure 9:
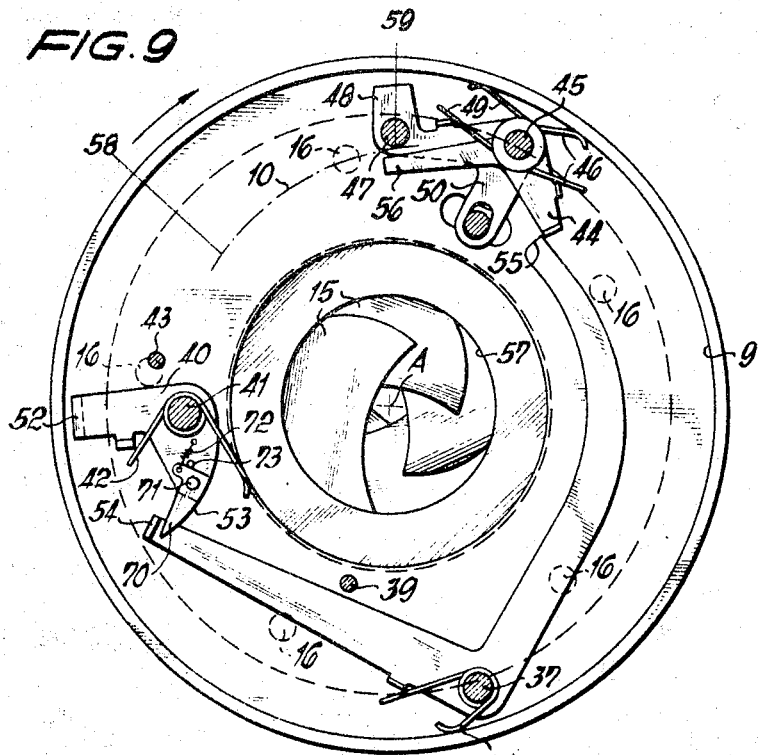
FIG. 9 shows the structure of FIG. 8 with the parts illustrated in a position which they take subsequent to the position shown in FIG. 8, the exposure aperture of FIG. 9 being uncovered, while this exposure aperture is covered in FIG. 8.
Figure 10:
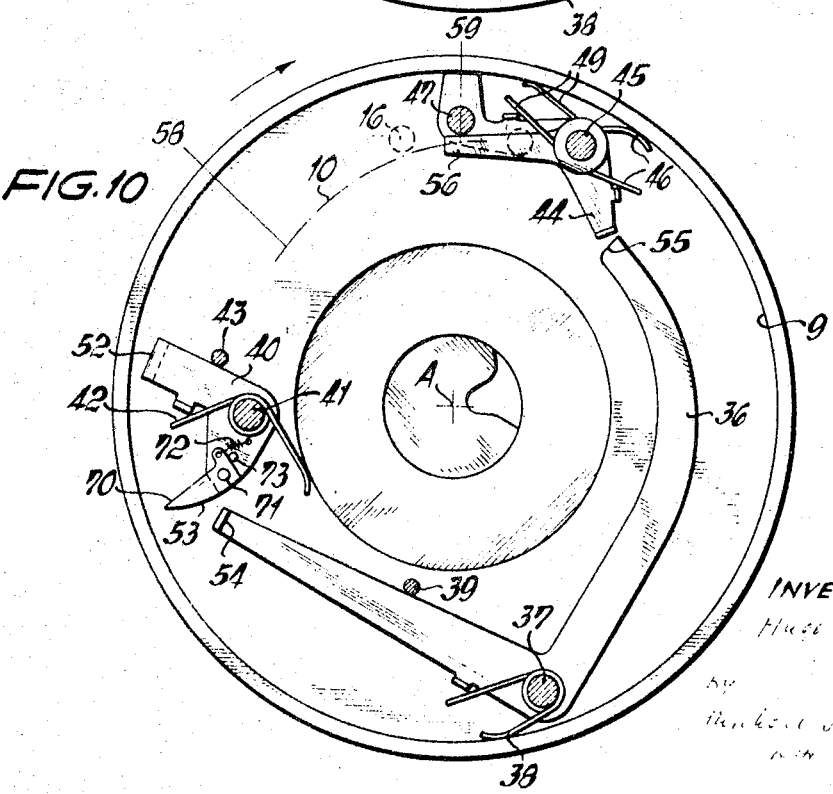
FIG. 10 shows a structure similar to that of FIGS. 8 and 9 but used to operate a different type of blade assembly.

The embodiment of FIGS. 8 and 9 shows the invention as applied to a shutter where the blades are automatically actuated after cocking of the shutter and where the shutter includes more than two blades.

Referring to FIGS. 8 and 9, the structure includes a lever 36 supported for turning movement by a stationary pin 37 and urged by the spring 38 to turn in a clockwise direction. A stationary stop pin 39 engages the lever 36 to limit the turning thereof by the spring 38. The manually operable release lever 40, which has a portion 52 accessible to the operator, is supported for turning movement by the stationary pin 41 and is urged to turn in a clockwise direction by a spring 42, the turning of the lever 40 by the spring 42 being limited by the stationary stop pin 43.

The drive means in this embodiment is in the form of a lever 44 supported for turning movement by a stationary pin 45 and urged by a spring 46 to turn in a clockwise direction. The turning of the lever 44 by the spring 46 is limited by engagement of the lever 44 with a pin 47 which is carried by and forms part of the moving means of this embodiment. The moving means is in the form of a lever 48 located behind the lever 44 and also supported for turning movement by the stationary pin 45, a spring 49, which is weaker than the spring 46, being operatively connected to the moving means 48 for urging the latter to turn in a counterclockwise direction. The moving means 48 includes an arm 50 formed with a slot receiving a pin 51 which is fixed to a ring 1 identical with that described above and actuating the blades 15 in exactly the same way, the stationary pivots 16 for the blades 15 being illustrated in FIGS. 8 and 9. An aperture setting ring which is not illustrated is again provided with a camming edge 10 and is turnable about the optical axis A in the manner described above.

The lever 40 pivotally carries a swing member 70 which is supported on a pivot pin 71 carried by the lever 40 and which is urged by a spring 72 connected to the swing member 70 and a pin fixed to the lever 40 into engagement with a stop pin 73 also fixedly carried by the lever 40.

When the operator depresses the arm 52 of the release lever 40 to turn the latter in a counterclockwise direction the curved edge 53 of the swing member 70 engages the lug 54 at the end of the lever 36 to turn the latter in a counterclockwise direction and the end 55 of the lever 36 slides along the lower end of the lever 44 displacing the latter slightly in a counterclockwise direction in opposition to the spring 46 until the lever 44 snaps back to the position shown in FIG. 9. This operation continues until the tip of the swing member 70 rides off the lug 54 whereupon the spring 38 propels the lever 36 in a clockwise direction so that its end 55 engages the lug at the end of the lever 44 for turning the latter in a counterclockwise direction, and thus the arm 56 of the lever 44 moves away from the pin 47 so that the spring 49 can now turn the moving means 48 so as to turn the ring 1 and open the blades 15, this action continuing until the pin 47 engages the camming edge 10 so that this edge again determines the size of the aperture. The lever 36 continues to turn the drive means 44 in opposition to the spring 46 until the end 55 of the lever 36 rides off the end of the lever 44, and this instant represents the fully cocked position of the drive means 44. Thereafter an unillustrated retarding mechanism which has been preset to provide a selected exposure time retards the return of the lever 44 by the spring 46 so that the blades will remain in their open position for a period corresponding to the selected exposure time whereupon the spring 46 drives the member 44 into engagement with the pin 47 to cause the moving means 48 to return to its starting position closing the blades 15, and the parts are again in their initial position. When the operator releases the lever 40 the spring 42 will return to its starting position and the swing member 70 at this time will turn relative to the lever 40 in opposition to the spring 72 until it rides off the lug 54 to again become located in the position shown in FIG. 8.

Thus, with this embodiment also the drive means 44 turns at each operation in exactly the same way through the same distance to provide the selected exposure time independently of the size of the aperture. Of course, the spring 38 is strongr than the spring 46. When the camming edge 10 has been turned to locate its end 58 in the path of the pin 47, the largest aperture will be provided. In the position of FIGS. 8 and 9 the smallest aperture is provided. Thus, with this embodiment also a stepless adjustment of the exposure aperture can be provided either manually or automatically.

Figure 15:
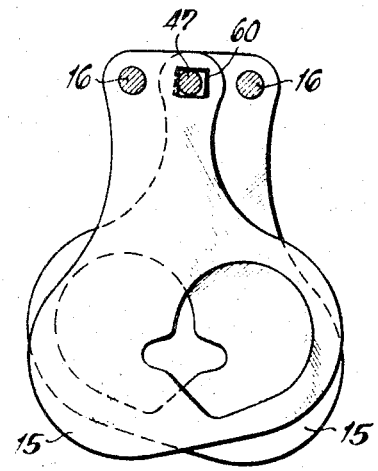
FIG. 15 is a diagrammatic illustration of the blades used in the embodiment of FIGS. 10–14.
Figure 16:
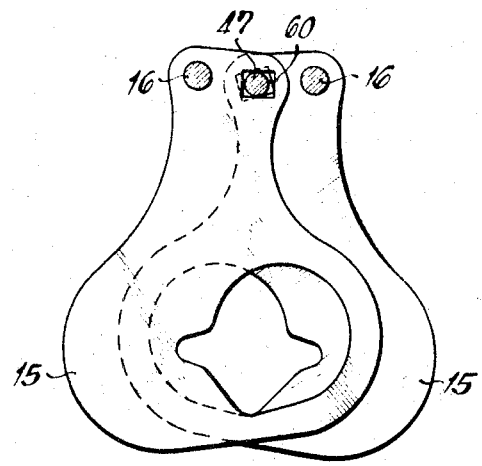
FIG. 16 illustrates the position which the blades of FIG. 15 take in order to provide a larger exposure aperture.

The embodiment of FIGS. 10–16 shows how the structure of FIGS. 8 and 9 can be used with an assembly which includes only two blades 15. In this case the blades 15 have the configuration shown in FIGS. 15 and 16 and are respectively supported by a pair of pins 16. There are no pins 18 or ring 1. The pin 47 is extended so as to enter into the pair of overlapping openings 60 of blades 15 of FIGS. 15 and 16 so that as the pin 47 moves toward the optical axis the blades 15 will turn downwardly away from each other to provide an increasingly larger aperture, while when the pin 47 is in the position of FIG. 10 the aperture is closed. The blade arrangement of FIGS. 15 and 16 provides a symmetrical aperture. The drive lever 44 operates in exactly the manner described above with respect to FIGS. 8 and 9 so that before it is released by the lever 36 the pin 47 engages the camming edge 10 to provide an aperture in accordance with the angular position of the camming edge 10. The parts are shown in their rest position in FIG. 10, while FIG. 11 shows the parts at the instant when the tip of swing member 70 rides off the lug 54 of the lever 36. FIG. 12 shows the position which the parts take just before the drive means 44 is fully cocked and is about to be automatically released. It will be noted that with the position of the camming edge 10 in FIG. 12 a relatively small aperture is provided by the pair of blades 15, while with the position of the camming edge 10 of FIG. 13 a larger aperture is provided. FIG. 14 shows the position which the parts take after the drive means 44 has been turned by the spring means 46 back to its initial position where the aperture is again closed.

With any of the above embodiments the exposure time may be set by any suitable known structure such as, for example, by a structure which will change the tension of the spring which drives the drive means, by an adjustment of a known retarding mechanism, or any other known exposure-time setting structure, and in all cases the particular exposure time will have no influence on the particular aperture.

In order to make a bulb exposure according to which the blades remain in their open position for a period determined manually by the operator, any known structure for this purpose may be used so that the details thereof are not shown or described.

It is also possible to use the structure of the invention with arrangements in which the exposure time and aperture are coupled to each other so as to provide preselected light values, as well known in the art.

It will be understood that each of the elements described above, or two or more together, may also find a useful application in other types of photographic devices differing from the types described above.

While the invention has been illustrated and described as embodied in shutter-diaphragm assemblies, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a shutter-diaphragm assembly for photographic devices, in combination, support means formed with an exposure aperture whose center is in the optical axis; a single set of blades carried by said support means for movement to and from a closed position covering said aperture to prevent light from passing therethrough; moving means carried by said support means for movement from and back to a predetermined starting position, said moving means being operatively connected to said blades for locating the latter in their closed position when said moving means is in said starting position thereof and said moving means moving said blades to uncover said aperture during movement of said moving means away from said starting position thereof and to cover said aperture during movement of said moving means back to said starting position thereof; adjustable limiting means carried by said support means and located in the path of movement of said moving means from said starting position thereof for adjustably limiting the extent to which said moving means moves away from said starting position so as to limit the extent to which said blades uncover said aperture whereby said blades perform the function of an adjustable diaphragm; and drive means carried by said support means for movement through the same distance at each operation of the assembly irrespective of the extent to which said moving means moves from said starting position thereof, said drive means being adapted to be connected to an exposure-time determining structure and, after being retarded by the latter structure to provide a given exposure time, moving from a location out of driving engagement with said moving means into driving engagement with said moving means for returning the latter to said starting position thereof and thus returning said blades in their closed position, so that the exposure time is uninfluenced by the extent to which said aperture is uncovered by said blades and so that said single set of blades also perform the function of a shutter.

2. In a shutter-diaphragm assembly, as recited in claim 1, spring means operatively connected to said moving means for urging the latter away from said starting position thereof and said drive means having an initial position holding said moving means in said starting position thereof in opposition to said spring means, said drive means during movement through said distance first releasing said moving means to said spring means and then, after being retarded to provide a given exposure time, engaging said moving means and returning the latter to said starting position thereof in opposition to said spring means.

3. In a shutter-diaphragm assembly as recited in claim 2, a second spring means being operatively connected to said drive means for advancing the latter at least in part through said distance and manually operable means operatively engaging said drive means for releasing the latter to said second spring means.

4. In a shutter-diaphragm assembly as recited in claim 3, said drive means being adapted to be manually cocked to tension said second spring means before release of said drive means by said manually operable means.

5. In a shutter-diaphragm assembly as recited in claim 3, said manually operable means operating automatically, irrespective of the manner in which said manually operable means is manipulated by the operator, first to move said drive means in one direction while tensioning said second spring means and then to release said drive means to the tensioned second spring means.

6. In a shutter-diaphragm assembly as recited in claim 1, said adjustable limiting means including a cam carried by said support means for movement about the optical axis and having a camming edge which determines the extent to which said moving means moves away from said starting position thereof.

7. In a shutter-diaphragm assembly as recited in claim 1, said drive means including a rotary drive member supported by said support means for turning movement about a predetermined axis and including an arcuate edge portion located along a circle whose center is in said predetermined axis and engaging said moving means to retain the latter in said starting position thereof, and manually operable release means operatively connected to said rotary member to release the latter for rotation so that said moving means is not released for movement from said starting position thereof until after said drive means has been released so as to turn for displacing said arcuate edge portion away from said moving means, and spring means operatively connected to said driving means for urging said rotary member thereof to turn through said distance.

8. In a shutter-diaphragm assembly as recited in claim 7, said rotary member of said drive means having an elongated radial arm opposed to said arcuate edge portion thereof and extending to a greater distance from said predetermined axis than said arcuate edge portion, and said arm engaging said moving means for returning the latter to said statring position thereof during movement of said drive means through said distance.

9. In a shutter-diaphragm assembly as recited in claim 8, releasable holding means automatically engaging said moving means when the latter has been returned by said arm to said starting position for releasably holding said moving means in said starting position thereof, said manually operable release means acting on said releasable holding means to actuate the latter to release said moving means prior to release of said drive means by said manually operable release means.

10. In a shutter-diaphragm assembly as recited in claim 9, said drive means being adapted to be manually cocked and said releasable holding means holding said moving means in said starting position during cocking of said drive means so as to prevent uncovering of said aperture during cocking of said drive means.

11. In a shutter-diaphragm assembly as recited in claim 1, said adjustable limiting means being adapted to be automatically set by a light-responsive structure at a position which will uncover said aperture to an extent which is proper for the particular lighting conditions.

12. In a shutter-diaphragm assembly for photographic devices, in combination, shutter means movable from a fully closed position toward a full open position; adjustable limiting means cooperating with said shutter means for adjustably limiting the extent of movement thereof from said fully closed toward said fully open position so as to determine the size of the aperture provided by said shutter means, so that said shutter means can also act as a diaphragm; and drive means cooperating with said shutter means for returning the latter to said closed position thereof, said drive means being movable from a location out of driving engagement with said shutter means to a location in driving engagement therewith for returning the latter to said closed position thereof, whereby before said drive means is located in driving engagement with said shutter means said drive means may be retarded to provide an exposure time uninfluenced by the extent to which said shutter means moves from said fully closed toward said fully open position thereof.

References Cited by the Examiner
UNITED STATES PATENTS

| | | | |
|---|---|---|---|
| 761,756 | 6/04 | Brueck | 95—63 |
| 885,142 | 4/08 | Brownell | 95—63 |
| 2,969,007 | 1/61 | Groger | 95—56 |

NORTON ANSHER, *Primary Examiner.*

JOHN M. HORAN, *Examiner.*